United States Patent
Yeh et al.

(10) Patent No.: US 7,346,405 B2
(45) Date of Patent: Mar. 18, 2008

(54) INTERFACE FOR REMOTE MONITORING AND CONTROL OF INDUSTRIAL MACHINES

(75) Inventors: Thomas I. Yeh, Rochester, NY (US); Kevin R. Hann, Spencerport, NY (US); Timothy J. Spires, Rochester, NY (US); Mark D. Goodlein, Hilton, NY (US); Sam Wang, Fresh Meadows, NY (US)

(73) Assignee: Connected Energy Corp., Rochester, NY (US)

( * ) Notice: Subject to any disclaimer, the term of this patent is extended or adjusted under 35 U.S.C. 154(b) by 69 days.

(21) Appl. No.: 10/005,043

(22) Filed: Dec. 4, 2001

(65) Prior Publication Data

US 2003/0109942 A1    Jun. 12, 2003

(51) Int. Cl.
*G05B 15/00* (2006.01)

(52) U.S. Cl. ............... 700/83; 710/8; 710/63; 709/250

(58) Field of Classification Search ........... 709/220, 709/221, 250; 700/19, 83; 710/10, 11, 63, 710/8
See application file for complete search history.

(56) References Cited

U.S. PATENT DOCUMENTS

| | | | | |
|---|---|---|---|---|
| 5,367,646 A * | 11/1994 | Pardillos et al. | ............... | 710/63 |
| 5,729,204 A * | 3/1998 | Fackler et al. | ................ | 340/2.4 |
| 5,745,794 A * | 4/1998 | Poloniewicz et al. | ......... | 710/62 |
| 5,875,415 A * | 2/1999 | Lieb et al. | .................. | 702/122 |
| 5,963,450 A * | 10/1999 | Dew | .......................... | 700/169 |
| 6,032,203 A * | 2/2000 | Heidhues | ...................... | 710/11 |
| 6,085,227 A * | 7/2000 | Edlund et al. | ............... | 709/203 |
| 6,088,624 A * | 7/2000 | Khan et al. | .................... | 700/86 |
| 6,098,116 A * | 8/2000 | Nixon et al. | .................... | 710/8 |
| 6,128,673 A * | 10/2000 | Aronson et al. | ................ | 710/22 |
| 6,131,125 A * | 10/2000 | Rostoker et al. | ............. | 709/250 |
| 6,138,180 A * | 10/2000 | Zegelin | ........................ | 710/11 |
| 6,185,466 B1 * | 2/2001 | Nicewonger | .................. | 700/19 |
| 6,314,479 B1 * | 11/2001 | Frederick et al. | .............. | 710/63 |
| 6,334,160 B1 * | 12/2001 | Emmert et al. | ................ | 710/11 |
| 6,362,836 B1 * | 3/2002 | Shaw et al. | .................. | 345/744 |
| 6,430,740 B1 * | 8/2002 | Hart et al. | ................... | 717/108 |

(Continued)

OTHER PUBLICATIONS

Modicon, Inc., "Modicon Modbus Protocol Reference Guide" (PI-MBUS-300, Version J), Jun. 1996, Chapter 1: pp. 1-16.

*Primary Examiner*—Jungwon Chang
(74) *Attorney, Agent, or Firm*—Stephen B. Salai, Esq.; Michael J. Didas, Esq.; Harter Secrest & Emery LLP (57) ABSTRACT

An interface for connecting one of a plurality of industrial machines having different data format and storage configurations to a communications medium for remote monitoring and control, includes a programmable apparatus having a memory for storing data in predetermined locations and in a predetermined format, and for storing configuration information relating to the at least one of the machines; a configurable electrical interface responsive to the configuration information for receiving machine data from the machine and sending data to the machine; a data translator responsive to the configuration information, receiving data from the interface and transforming the data to the predetermined format; a processor responsive to the configuration information for reading data from and writing data to the predetermined locations in the memory; and a communications port connected to the communications medium.

14 Claims, 6 Drawing Sheets

U.S. PATENT DOCUMENTS

| | | | |
|---|---|---|---|
| 6,496,893 B1 * | 12/2002 | Arai | 710/302 |
| 6,501,995 B1 * | 12/2002 | Kinney et al. | 700/1 |
| 6,526,323 B1 * | 2/2003 | Miyajima et al. | 700/9 |
| 6,529,936 B1 * | 3/2003 | Mayo et al. | 709/202 |
| 6,580,950 B1 * | 6/2003 | Johnson et al. | 700/17 |
| 2001/0042150 A1 * | 11/2001 | Moroz et al. | 710/103 |
| 2002/0112084 A1 * | 8/2002 | Deen et al. | 709/250 |

* cited by examiner

High-Level WCC System Block Diagram

INTERFACE FOR REMOTE MONITORING AND CONTROL OF INDUSTRIAL MACHINES

FIELD OF THE INVENTION

The present invention relates to the remote monitoring, communication with and control of industrial machines including but not limited to air compressors, boilers, chillers, distributed generators and heating, ventilation and air conditioning (HVAC) equipment and the like and more particularly to a versatile interface for connecting such machines, even machines not originally designed for remote control, to a communications network.

BACKGROUND OF THE INVENTION

Many new and existing industrial machines such as air compressors and the like have communication ports permitting devices such as personal computers to be attached to the machines for monitoring the performance of the machines and controlling the operation of the machine. Conventionally, specialized software is provided to permit the computers or other devices to communicate with the machine. While there are several "standards," none of the standards has been universally adopted. Further, none of the standards are not compatible with one another. Past and existing solutions to enabling remote communication and control of industrial equipment can be categorized into the following:

(i) Adopt an open and de-facto protocol for a communication port.
  (a) The Modicon Bus (MODBUS) protocol, was created in 1978 by Modicon as a way for transferring control data between controllers and sensors using an RS232 port. Since the introduction, MODBUS has become a de-facto industry standard used by multiple control and sensor companies as their protocol for exchanging data with other devices. Currently, MODBUS protocol claims to be the most supported protocol amongst Industry Automation devices. The primary use of MODBUS is to transfer discrete/analog I/O and register data between control devices. It is important to note that MODBUS is a low-level communications protocol that specifies as set of functions and data registers.
  (b) The LONWORKS platform created by Echelon Corporation is another open protocol. In 1994 Echelon published guidelines for interoperability of networked devices in buildings, factories, transportation systems and homes based on the Lonworks Control Network (LONWORKS). Since launch Echelon has also applied LONWORKS for used in Industrial Automation applications as the field and sensor bus for control.
(ii) Built-in remote access directly into the control panel.
  (a) The WebMaster water treatment controller from Walchem Corporation employs the built in remote access. In this approach, a modem and an embedded web server are integrated into the WebMaster Controller. The operating state and parameters of the controller are remotely accessed by first dialing up the controller using the built-in POTS modem. Once the connection is established, the embedded web server in the controller serves up web pages for viewing and modifying the parameters of the controller.
  (b) The electronic control panel used by Capstone Microturbine Corporation on their power generation system. The communication port in Capstone's control panel can be directly connected to a POTS modem for remote access. The control panel is capable of responding to commands and queries into internal registers using protocol proprietary to Capstone.
(iii) Custom developed remote monitoring and management software/hardware solution in accordance to particular equipment specifications.
  (a) An example of the custom developed solution CentryCLC and CentryPCS control system by Connected Energy. In this approach, remote connection is enabled by a solution specifically developed to a collection of equipments installed at a specific site. In the instance where the original equipment manufacturer (OEM) control panel does not provide a communication port, the CentryCLC replaces OEM control panel with a microprocessor-based industrial controller programmed specifically to operate the equipment according to equipment's specification. A communication port is included in the replacement controller supporting an open protocol such as MODBUS. A separate system such as the CentryPCS is deployed connecting to the communication port of the controller to provide the remote communication and control access.

However, there is a need for an interface that can be connected to a large number of different, new or existing, industrial machines to provide for remote monitoring and control of such machines. To be practical, an interface must be standardized so that the interface can be manufactured relatively inexpensively in large numbers, while at the same time the interface must be sufficiently versatile to be connected to many different types of industrial machines, wherein the individual machines may have incompatible systems.

For example, a common aspect of the remote monitoring and control of machines is writing of data into registers or other memory storage. Except for the above-mentioned standards, there is little consistency either in the locations at which the information is stored or in the format in which the information is stored. Without knowing both the format and the location of the information, remote monitoring and control is impossible.

There is a also a need for a device to connect machines to a communications channel that can be adapted to the particular configuration of the machine while using common hardware, without requiring that the hardware be customized for each machine.

Industrial equipment outfitted with an electronic control panel often includes a serial communication port. The purpose of this communication port is to provide electronic access to the internal states and operating parameters governing or representing operation of the equipment. However, there is a general lack of standardization in accessing data through the communication port. Variability spans from electrical signaling levels, to data locations, to how data is formatted to represent the operating state or a parameter of the equipment. Users/operators of the equipment must rely on a proprietary software/hardware solution from the equipment manufacturer to access the communication port. User/operators of industrial equipment from different manufacturers are faced with buying and using different software/hardware combinations to access the varied electronic control panels.

There is a need for a remote monitoring and management solution that can be economically and rapidly configured to accommodate wide variety of industrial equipment from different manufacturers. In addition, the solution must enable the acceptance and adoption of remote monitoring and management of industrial equipment.

The existing art has not solved this problem because the prior solutions were not sufficiently configurable to be an economical and rapidly deployable solution to accommodate the differences in the implementation.

Specifically, open protocols are inadequate to fully isolate the differences in real-world implementation within the equipment control panel to be a true standard.

Even with protocols such as MODBUS and LONWORKS, there are still substantial variations in real-world implementations. For example, in the MODBUS protocol the location of the data and its format are not standardized. Manufactures are free to use the MODBUS protocol and have defined their own intent and use of the data registers. The end result is a vast array of higher-level implementations using the lower level MODBUS protocol yielding additional proprietary remote control and monitoring communications methods.

Therefore the current de-facto protocols cannot be relied upon to enable remote monitoring and management for a wide variety of equipment without making accommodation to the variability in equipment implementation. These solutions are specific to a specific site and applicable only to a particular collection of equipment types and models. This solution was not intended, and is not a sufficiently configurable without requiring significant alterations. That is, each new site with a different collection of equipment will require another custom developed solution.

The present invention is adaptive to the variations in use by manufacturers of the MODBUS, LONWORKS, and other low-level protocols via the present interface allowing programmability and rapid configuration. The invention is sufficiently configurable so that a common hardware device can be configured to adapt to a different collection of equipment varying by type and model.

SUMMARY OF THE INVENTION

Briefly stated and in accordance with one aspect of this invention, an apparatus for connecting an industrial machine to a communication circuit includes a programmable electrical interface connected to the industrial machine, a programmable data translator coupled to the electrical interface, and a communications port connected to the communications circuit.

The configuration of the programmable electrical interface and programmable data translator are established through data files referred to herein as personality files that configure the electrical interface and the translator according to the particular machine to which the interface is connected.

In one configuration, a personality file is interpreted at the time the electrical interface is manufactured to configure the electrical interface to a particular industrial machine. In accordance with this approach, the electrical interface remains configured for a particular machine until the electrical interface is reprogrammed.

In accordance with another configuration, a plurality of personality files are maintained on the interface device and configuration can take place in the field without the need for a separate personality file interpreter. In accordance with this embodiment, the electrical interface remains configured until a different personality file is interpreted and used to reconfigure the electrical interface.

In accordance with another aspect of the invention, additional changes may be made in the nature of software updates or the like without reconfiguring the interface.

In one configuration, the "personality file" is used to rapidly configure a common communication device adapting to a wide variety of industrial equipment from different manufacturers, for the purpose of exchanging data and enabling remote monitoring and control.

In addition, the use of a data transform module in conjunction with the definition of a common method of data representation is another aspect of this invention.

The definition of a transform definition language involving linking a set of low-level transform operators to convert data structure from a wide variety of manufacturers to the internal common data representation of the interface device is another feature of this invention.

The novel aspects of the invention set forth with particularity in the appended claims. The invention itself together further objects and advantages thereof may be more readily understood by reference to the following detailed description taken in conjunction with the accompanying drawings.

DETAILED DESCRIPTION OF A PREFERRED EMBODIMENT

The present invention provides a configurable interface device to enable remote monitoring and management of industrial equipment or machines from different manufacturers. Industrial machines include, but are not limited to compressors, air compressors, boilers, chillers, pumps, generators, HVAC equipment, fans, motors, ovens, engines.

Figure 1:
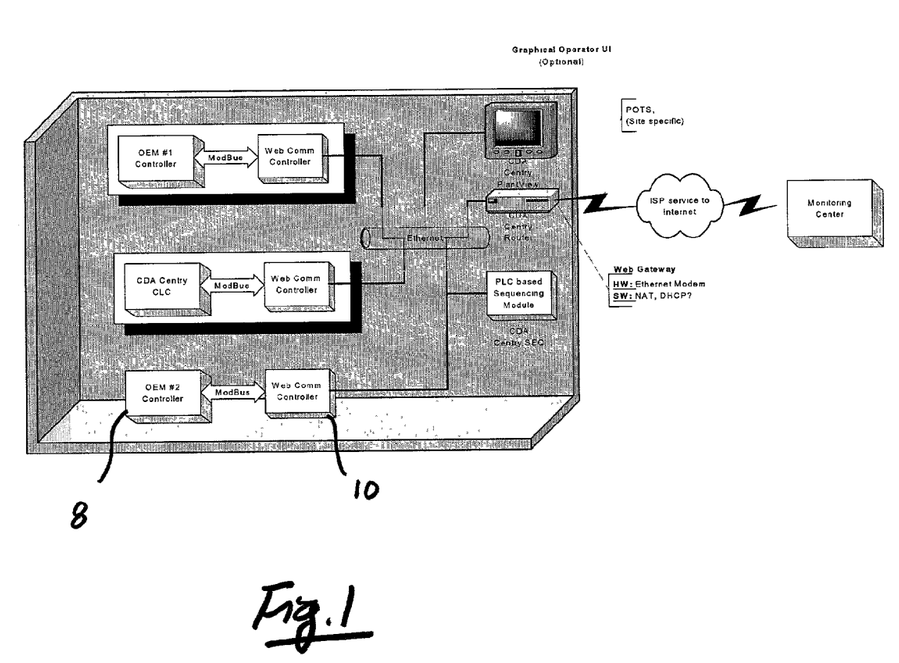
FIG. 1 is a schematic of the interface device in the context of a representative industrial application environment.
Figure 5:
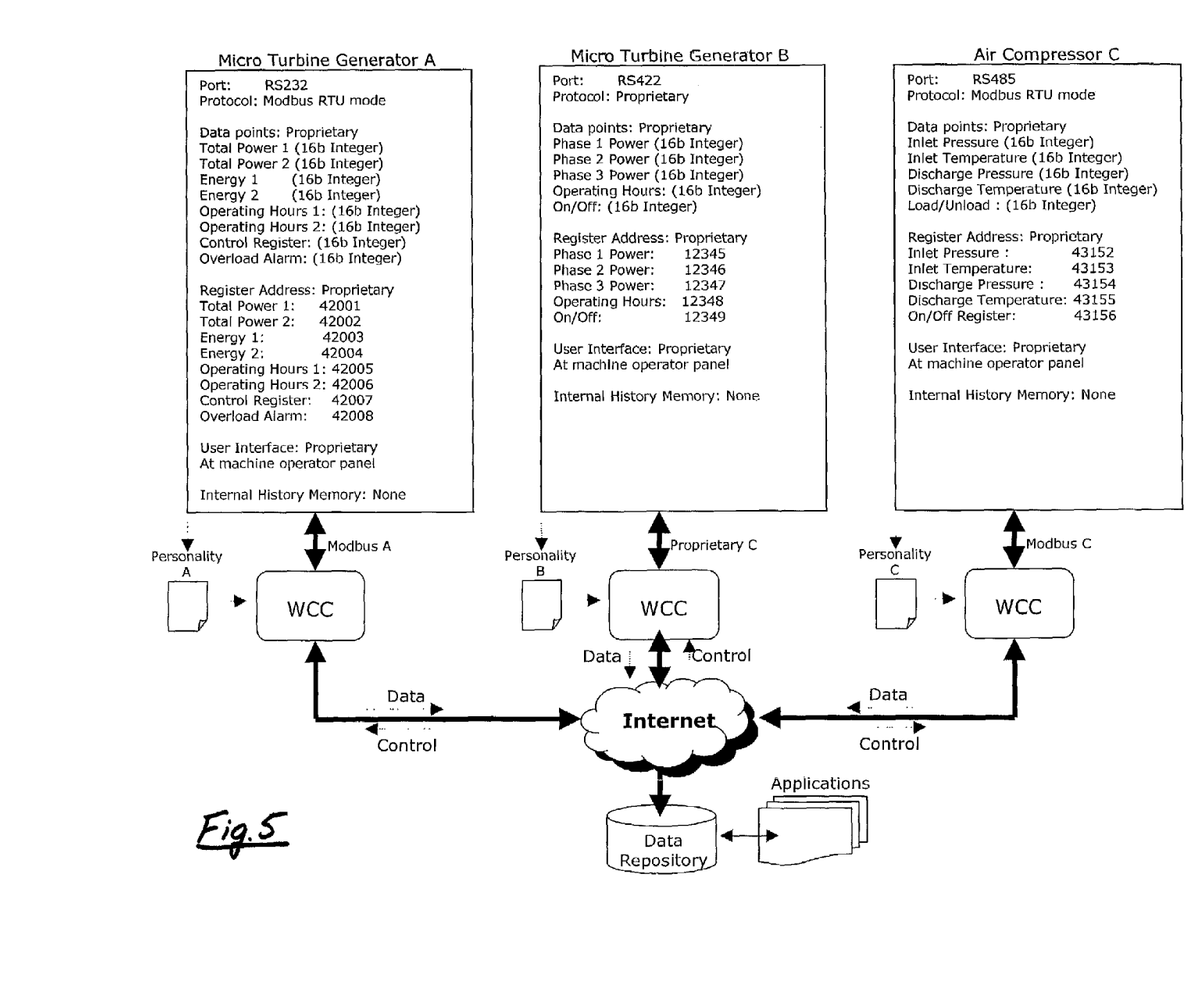
FIG. 5 is a schematic showing the interconnection of a plurality of different industrial machines through the interface device and a communications medium.
Figure 6:
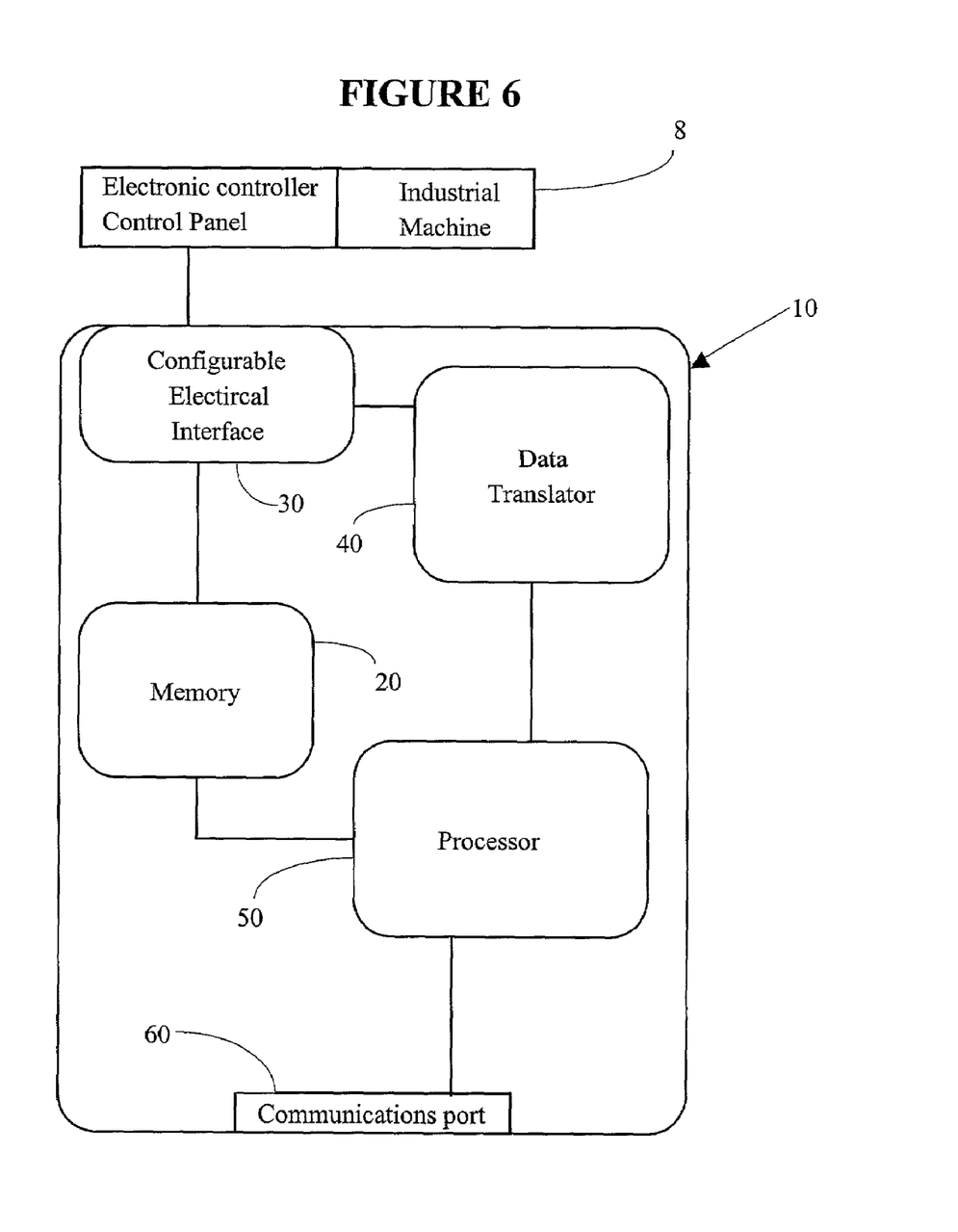
FIG. 6 is a block diagram of one configuration of the interface apparatus.

Generally, a preferred embodiment for connecting one of a plurality of industrial machines 8 having different data format and storage configurations to a communications medium for remote monitoring and control, includes a programmable interface apparatus 10 having a memory 20 for storing data in predetermined locations and in a predetermined format, and for storing configuration information relating to the at least one of the industrial machines; a configurable electrical interface 30 responsive to the electrical interface configuration information for receiving machine data from the industrial machine 8 and sending data to the industrial machine 8; a data translator 40 responsive to the configuration information, receiving data from the electrical interface and transforming the data to the predetermined format; a processor 50 responsive to the configuration information for reading data from and writing data to the predetermined locations in the memory; and a communications port 60 connected to the communications medium.

The interface 10 is selected to provide any subset of the following:

(1) Communicate with electronic controller and control panel(s) of a variety of industrial machines 8;

(2) Extract data representing operating state and parameters of the industrial machines at programmed regular intervals;

(3) Store the extracted data locally in non-volatile persistent storage;

(4) Transmit the data to one or more remote locations for the purpose of data archival, monitoring and control;

(5) Transmit the control commands received from local and remote locations to a controller/control-panel of the industrial machines; and (6) Provide an operator interface in the form of graphical screens.

Figure 2:
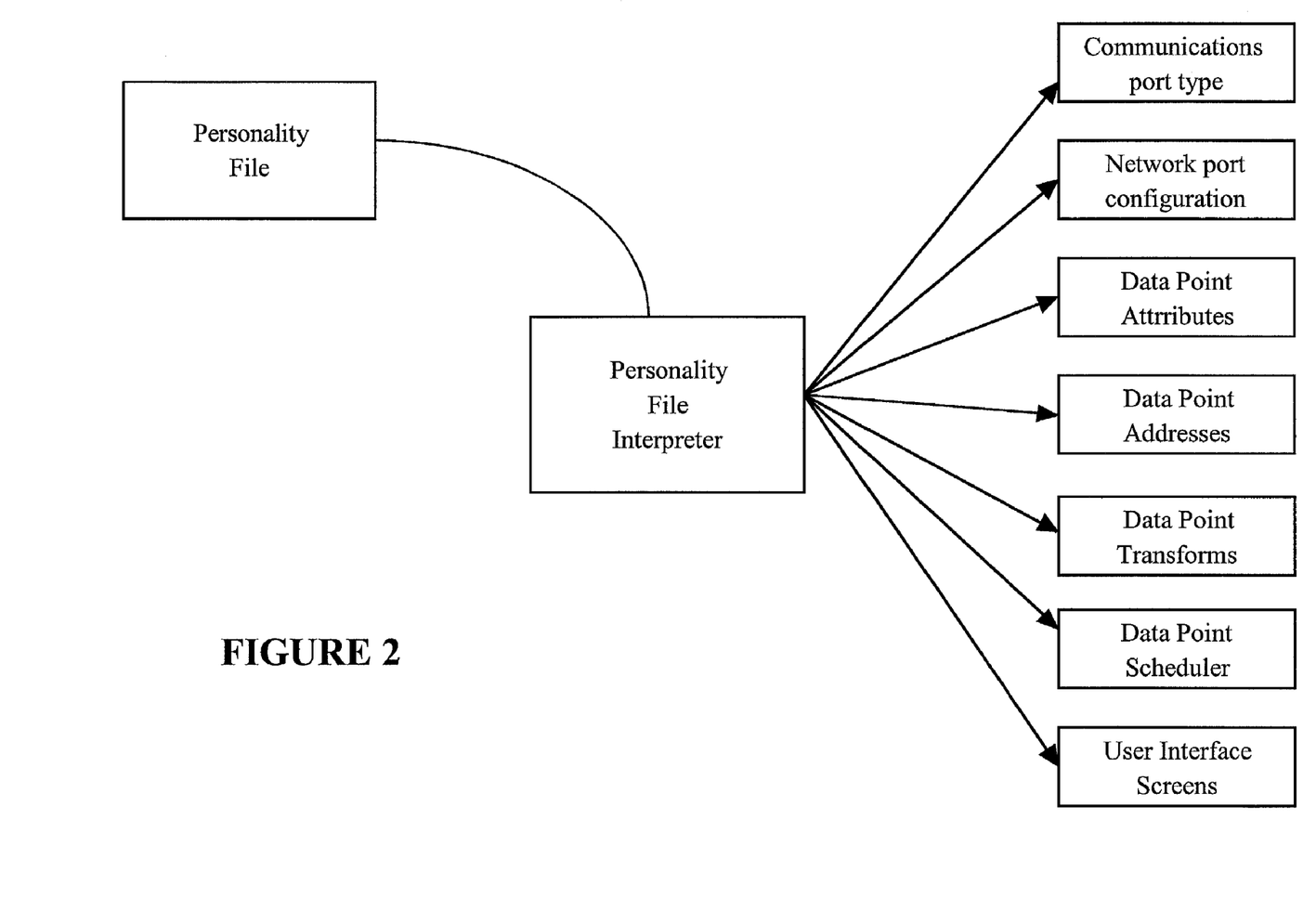
FIG. 2 illustrates a personality file being interpreted, wherein the instructions provided by the personality file are used to configure and program the requisite subsystems to adapt the interface device to the particulars of a piece of industrial equipment and the associated electronic controller/control-panel.

The hardware platform of the present interface device can be adapted to a variety of different industrial machines from different manufacturers and associated electronic controllers and control panels. The internal software is tailored to accommodate differences in the controller/control-panel of the particular industrial machine based on the instruction provided in the "personality file". The structure and definition of the personality file is selected to encapsulate the variability in the controller/control-panel implementation of the particular industrial machine.

The Personality file can address the following set of variations in controller/control-panel implementation of the particular industrial machine 8:

(1) Communications physical interface type;
(2) Serial communication port settings;
(3) Serial communication port protocol;
(4) Network communications port settings;
(5) Network communications port protocol;
(6) Data point locations;
(7) Data point attributes;
(8) Data point monitoring parameters;
(9) Data point transformation specification; and
(10) User interface screens.

It is understood this set of variables can be altered by addition or subtraction. However, it is anticipated the illustrated set is able to accommodate most of the industrial machines 8 of interest. Thus, the structure and definition of the personality file can be extended as additional industrial machine level variability is identified.

Data points are the measured data values representing the state and operating parameters of the industrial machine 8. There are presently no uniform standards used by the Industrial Equipment Manufacturers. The ability to adapt to variability of data representation is an advantage of the present configuration.

The personality file allows a flexible data representation internal to the interface device 10, wherein the data representation can adapt to variations in how different OEMs represent the respective industrial machine data within the particular controller/control-panel.

The following description of a preferred embodiment of a Personality File is illustrative.

Overview:

One of the features of the interface device 10 is the ability to easily and readily adapt to various OEM industrial machine controllers. To realize adaptation capability, the interface device 10 can customize and configure the embedded software while using a common, the same, hardware platform. This customization is express in the form of a Personality File (PF).

The personality file contains human readable text that describes the relationship between a WCC 10 and an OEM industrial machine controller. The PF includes definition sections bound by BEGIN/END indicator pairs. The individual data items are defined as TagName="Value", each on a separate line ending with carriage return (CR) and linefeed (LF). Each Value is enclosed within double quotes ("") without regard to it data type, i.e. string vs. integer.

The following is a description of an exemplary personality file in accordance with the invention.

Figure 3:
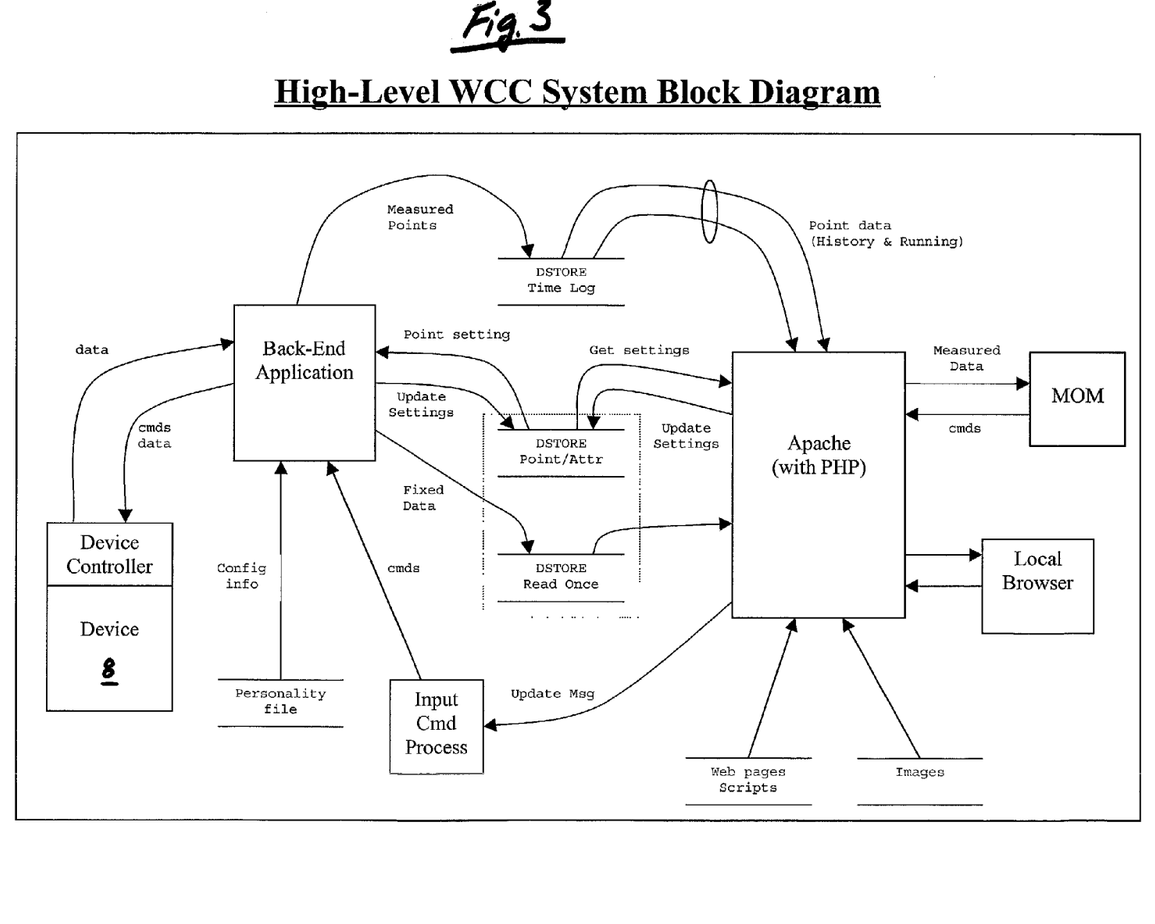
FIG. 3 is a block diagram showing the software of the interface.
Figure 4:
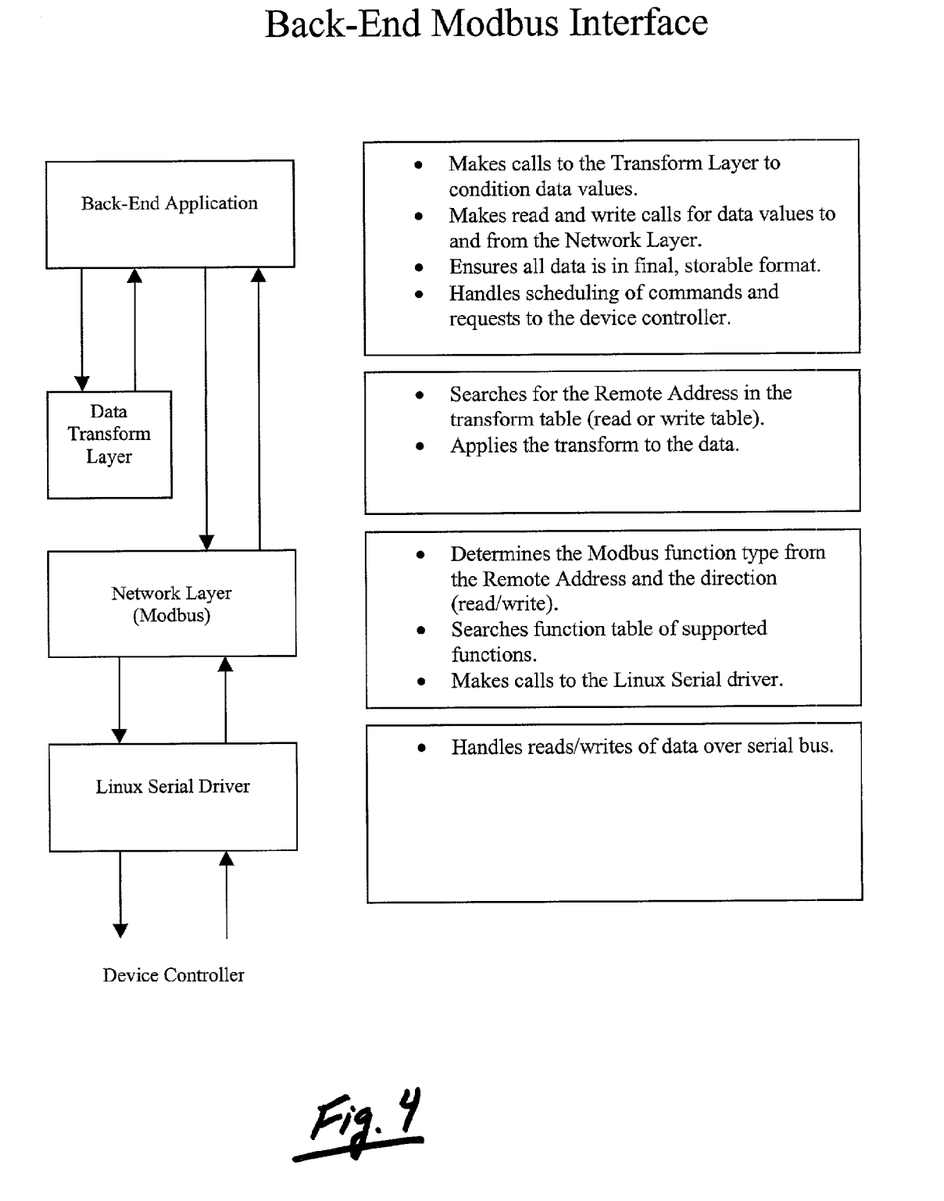
FIG. 4 an embodiment of the backend software system where the data representing operating state and parameters of the industrial equipment are flexibly handled.

The method to represent and transform data exchanged over the communication port that can be configured by the Personality File is as shown. This method can be embodied in two modules the Data Definition Module and the Data Transform Module.

Data Definition Module:

An important feature of the interface device 10 is a set of data definitions that are adaptable to variability in the data location, data attributes and the monitoring parameters within the controller/control-panel of a given industrial machine 8.

Data location refers to the register address or addresses for the data within the controller/control-panel.

Data attribute refers to how data are represented such as by types (e.g. Boolean, Integer, Floating Point, etc.), min/max scaling, conditional to another parameter, alarm levels, and any other processing needed to derive meaning (e.g. alarm codes, status codes, transforms, etc.).

Data monitoring parameters refers to how frequent the data should be accessed and method for deciding if a data should be retained in the persistent memory of the device 10.

The preferred embodiment stores actual measured points data as collected from the WCC controlled device (industrial machine 8). The points data placed into a data table and will be in the final values as defined via the PF, i.e. all transforms performed.

Data Transform Module:

Another aspect of the interface device 8 is the notion that a Data Transform Module will process all data items exchanged over the communication port 60. This Data Transform Module provides the mapping between the controller/control-panel implementation of data items representing the state and operating parameters of the industrial machine 8, and the data definitions used within interface device 10.

The interface also employs a Transform Definition Language to accommodate the wide range of possible transforms. The Transform Definition Language provides a set of transform primitives that can be linked together as a series of successive operators to produce the desired end transform. The transforms are bi-directional to handle data read from and written to the controller/control-panels of the industrial machine.

The following is a description of a preferred embodiment of a Transform Definition Language in accordance with the invention.

Overview

The Transform Definition Language allows the interface device 10 to easily adapt to various OEM industrial machine 8 controllers. To implement the adaptability, all the data items are passed through a Transform module/layer. The Transform module/layer provides the mapping between the OEM controller implementation of a particular data item and the WCC 10 representation of the data item.

Since the range of possible Transforms is very large, a means of expressing/defining these Transforms is necessary. To accomplish the means of expressing/defining these Transforms, the interface device includes a Transform Definition Language (TDL). The TDL includes a set of Transform primitives that can be linked together, as a series of Transforms, to produce the desired end Transform. Since data items are read from and written to the OEM controller, these Transforms will need to be defined for both data path directions. The Transforms may simply be the reverse of each other or more complex depending on the representation of the data item in the OEM controller of the industrial machine 8.

The representation of the desired data item Transform will occur as an attribute of a Point in the Point Attribute database table. There is a field to describe both the READ and WRITE Transforms for the data item. The fields will contain a comma-separated list of Transform IDs that describes the desired Transform series. However, it is understood other field separators can be employed. The Transform IDs are references to Transforms defined in the WCC Personality File (WCCPF) and use the TDL to describe the specific Transform.

Data Point Transform Types

The following is a list of definitions for the types of Transforms that may occur on Points within the WCC interface device system 10. Multiple transforms on a Point will be represented as a list of transform to be performed.

All transform primitives perform an operation on at least one operand, the current value. The current value is defined as the data which is currently being read/written to/from the controller or database, or any representation of that data during the transform process. Most of the transform primitives need to reference a second operand in order perform their operation. This second operand is represent by an operand identifier.

The data items and the series of transform primitives for each data item is specified in the Personality File and stored as an attribute in the Data Definition Module.

There are two approaches to implement the Personality File:

Approach 1

The personality file is interpreted at the factory by an external system to the present interface device 10. The resulting information is used to configure the WCC interface device 10 to a specific controller/control-panel for a given industrial machine 8. The interpretation of the personality file and the subsequent configuration of the WCC interface device 10 at the factory is done one time and will remain until the interface device 10 is to be re-configured to interface with a different controller/control-panel, typically associated with a different industrial machine 8. In this approach the configuration of the interface device 10 must occur at the factory since personality file and the interpretation system is external to the interface device.

Approach 2

The personality file is interpreted by software installed within the WCC interface device 10. The process begins by placing the personality file into the device 10. A special command is then executed which causes the personality file to be interpreted. The resulting information is used to configure the interface device 10 to a specific industrial machine 8 controller/control-panel. The interpretation of the personality file and the subsequent configuration of the internal settings of the interface device 10 are done one time and will remain until the interface device is to be re-configured to interface with a different controller/control-panel, typically associated with a different industrial machine 8. The configuration can be considered as a one-time initialization before which the interface device 10 is not operable. Moreover this initialization can be done either in the field or at the factory.

In both approaches, there can be additional changes at the application level after the interface device has been configured to a specific industrial machine controller/control-panel. These changes will be accommodated via software upgrades, which also can be delivered after the interface device has been installed in the field.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

We claim:

1. A programmable interface apparatus for connecting one of a plurality of industrial machines having different data format and storage configurations and different electrical interface characteristics to a communications medium for remote monitoring and control comprising:

(a) a memory for storing data in predetermined locations and in a predetermined format, and for storing both electrical interface configuration information and data translation configuration information relating to the at least one of the industrial machines;

(b) a configurable electrical interface adapted to be directly connected to one of the industrial machines and responsive to the configuration information for configuring the electrical interface characteristics of the electrical interface in response to the stored electrical interface configuration information relating to at least one of the plurality of industrial machines for receiving machine data from the industrial machine and sending data to the industrial machine;

(c) a configurable data translator responsive to the stored data translation configuration information, receiving data from the interface and transforming the data to the predetermined format;

(d) a processor responsive to the configuration information for reading data from and writing data to the predetermined locations in the memory; and (e) a communications port connected to the communications medium.

2. The programmable interface apparatus of claim 1, in which the information relating to the industrial machine includes data transform information, and the data translator is responsive to the data transform information.

3. The programmable interface apparatus of claim 1, further comprising a display coupled to the processor for displaying the data to a user.

4. The programmable interface apparatus of claim 1, in which the memory storing configuration information is non-volatile memory.

5. The programmable interface apparatus of claim 4, in which the memory storing configuration information is removable memory.

6. The programmable interface apparatus of claim 1, further comprising a configuration processor separate from the apparatus and removably connectable to the apparatus for processing configuration information and loading the configuration information into the memory.

7. The programmable interface apparatus of claim 1, in which the configuration information comprises configuration information for a plurality of industrial machines.

8. A method of connecting one of a plurality of industrial machines having different data format and storage configurations and different electrical interface characteristics to a communications medium for remote monitoring and control, the method comprising:
- (a) storing data in predetermined locations and in a predetermined format, and storing both electrical interface configuration information and data translation configuration information relating to the at least one of the industrial machines in a memory;
- (b) configuring an electrical interface for direct connection to at least one of the industrial machines in response to the stored electrical interface configuration information and directly connecting the interface to the machine;
- (c) receiving machine data from the industrial machine and sending data to the industrial machine through the configurable directly connectable electrical interface responsive to the configuration information;
- (d) configuring a data translator in response to the stored data translation configuration information for receiving data from the interface and transforming the data to the predetermined format the data translator responsive to the data translation configuration information;
- (e) reading data from and writing data to the predetermined locations in the memory with a processor responsive to the data translation configuration information; and
- (f) connecting a communications port to the communications medium.

9. The method of claim 8, further comprising including data transform information in the information relating to the industrial machine, and the data translator is responsive to the data transform information.

10. The method of claim 8, further comprising coupling a display to the processor for displaying the data to a user.

11. The method of claim 8, further comprising storing the configuration information in a non-volatile memory.

12. The method of claim 11, further comprising removing the memory storing configuration information.

13. The method of claim 8, further comprising processing both electrical interface configuration information and data translation configuration information and loading the configuration information into the memory in a configuration processor separate from the apparatus and removably connectable to the apparatus.

14. The method of claim 8, further comprising retaining both electrical interface configuration information and data translation configuration information for a plurality of industrial machines in the configuration information.

\* \* \* \* \*